(12) United States Patent
Zhang et al.

(10) Patent No.: US 11,122,401 B2
(45) Date of Patent: Sep. 14, 2021

(54) EMERGENCY MESSAGE TRANSMISSION METHOD BASED ON D2D COMMUNICATION IN INTERNET OF VEHICLES

(71) Applicant: NANJING UNIVERSITY OF POSTS AND TELECOMMUNICATIONS, Jiangsu (CN)

(72) Inventors: Dengyin Zhang, Jiangsu (CN); Min Zhang, Jiangsu (CN); Fei Ding, Jiangsu (CN); Nianqi Zhang, Jiangsu (CN); Lufeng Yuan, Jiangsu (CN)

(73) Assignee: NANJING UNIVERSITY OF POSTS AND TELECOMMUNICATIONS, Nanjing (CN)

( * ) Notice: Subject to any disclaimer, the term of this patent is extended or adjusted under 35 U.S.C. 154(b) by 0 days.

(21) Appl. No.: 16/968,248

(22) PCT Filed: Jun. 20, 2019

(86) PCT No.: PCT/CN2019/092051
§ 371 (c)(1),
(2) Date: Aug. 7, 2020

(87) PCT Pub. No.: WO2020/007198
PCT Pub. Date: Jan. 9, 2020

(65) Prior Publication Data
US 2021/0037361 A1   Feb. 4, 2021

(30) Foreign Application Priority Data

Jul. 3, 2018 (CN) .......................... 201810718157.6

(51) Int. Cl.
*H04W 4/46* (2018.01)
*H04W 4/90* (2018.01)
*H04W 4/02* (2018.01)

(52) U.S. Cl.
CPC ............. *H04W 4/46* (2018.02); *H04W 4/023* (2013.01); *H04W 4/90* (2018.02)

(58) Field of Classification Search
None
See application file for complete search history.

(56) References Cited

U.S. PATENT DOCUMENTS 9,154,736 B1 * 10/2015 Pan .......................... H04N 7/15
10,311,705 B1 * 6/2019 Aljuaid ................... F16P 3/147
(Continued)

FOREIGN PATENT DOCUMENTS

CN        103903479 A     7/2014
CN        106332032 A     1/2017
(Continued)

*Primary Examiner* — Ernest G Tacsik
(74) *Attorney, Agent, or Firm* — Matthias Scholl P.C.; Matthias Scholl

(57) ABSTRACT

Disclosed in the invention is an emergency message transmission method based on D2D communication in IoV. Firstly, priority indexes are established for a set of vehicles within a safety range of a certain vehicle, and D2D connection pairs are established in ascending order of the priority indexes to transmit messages; and then, distance prediction is performed on the set of vehicles outside the safety range, priority indexes are established according to predicted distances, and D2D connection pairs are established in ascending order of the priority indexes to transmit messages. If same priority indexes appear, vehicles on the same lane are selected first. The invention implements timely transmission of safety warning information on basis of D2D communication, and performs safety warning, thereby solving the technical problem of inability to transmit safety information in time, and improving transmission performance of traffic messages. Therefore, the invention has high reliability and real-time properties.

8 Claims, 1 Drawing Sheet

(56) References Cited

U.S. PATENT DOCUMENTS

| | | | |
|---|---|---|---|
| 2016/0169688 A1 | 6/2016 | Kweon et al. | |
| 2016/0210105 A1* | 7/2016 | Ru | H04L 67/16 |
| 2016/0358466 A1* | 12/2016 | Youngblood | H04W 4/90 |
| 2017/0048036 A1 | 2/2017 | Tavildar et al. | |
| 2018/0101172 A1* | 4/2018 | Min | G05D 1/0287 |
| 2019/0041223 A1* | 2/2019 | Yang | H04W 12/122 |
| 2019/0051159 A1* | 2/2019 | Wang | G05D 1/0027 |

FOREIGN PATENT DOCUMENTS

| | | |
|---|---|---|
| CN | 106485947 A | 3/2017 |
| CN | 107534982 A | 1/2018 |
| CN | 108183811 A | 6/2018 |
| CN | 108966183 A | 12/2018 |

\* cited by examiner

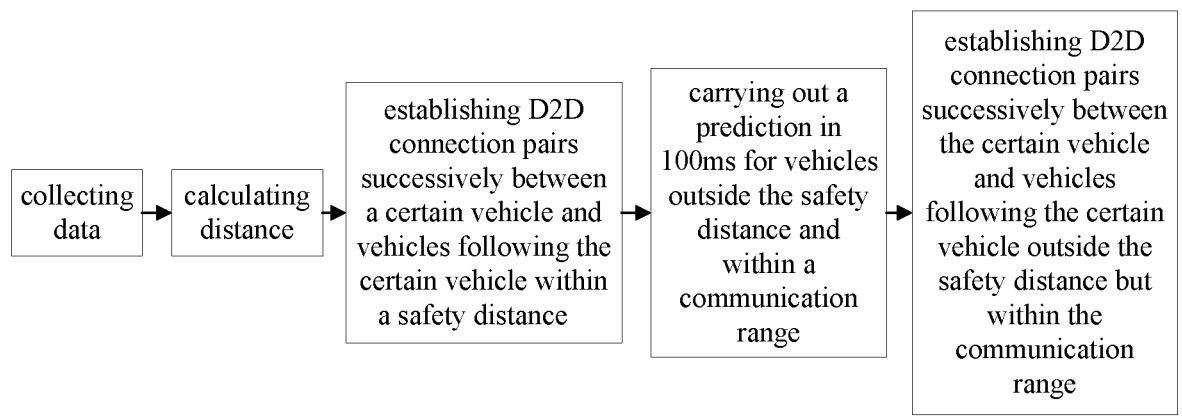

EMERGENCY MESSAGE TRANSMISSION METHOD BASED ON D2D COMMUNICATION IN INTERNET OF VEHICLES

TECHNICAL FIELD

The disclosure relates to the field of information transmission technology in Internet of Vehicles, and in particular to a method for transmitting an emergency message based on D2D communication in Internet of Vehicles.

BACKGROUND

Traditional Internet of Vehicles achieves communication between vehicles or between vehicles and roadside infrastructure by using Dedicated Short Range Communication (i.e. DSRC), which is hard to guarantee effectiveness and reliability of communication due to the limited transmission range of DSRC and the lack of supporting infrastructure. The traffic state will be repeatedly broadcast in a short time and a short distance when a traffic accident occurs, so the information continuously exchanged between vehicles may go beyond the load of the base station to cause network congestion, so that safety information cannot being spread timely. As one of the key technologies of 5G technology, D2D (i.e. Device-to-Device) communication can allow terminal users to share cell resources under the control of the cellular system to communicate directly within a certain range. The data traffic of this communication method does not pass through the base station and the core network, thereby reducing the communication delay and the pressure of the base station.

SUMMARY

In order to solve above problem, the disclosure proposes a method for transmitting an emergency message based on D2D communication in Internet of Vehicles to realize a timely transmission of safety warning information to carry out safety warning, to solve a technical problem that safety information cannot be transmitted in time.

The disclosure adopts the following technical solution: a method for transmitting an emergency message based on D2D communication in Internet of Vehicles, in which different priority indexes are established for vehicles set within and outside a safety range of a certain vehicle respectively, a D2D connection pair between the certain vehicle and a vehicle in the vehicle sets is established in order of the priority indexes from small to large to transmit a message; and if vehicles with the same priority index appear, the vehicle in the same lane among them is preferentially selected to establish a D2D connection pair. Specific steps of the method are as follows:

1) vehicle i collecting information about an adjacent vehicle j periodically during driving, comprising a position $(x_j, y_j)$ of the vehicle j, a speed $v_j$ of the vehicle j, and a lane $R_1$ or $R_2$ of the vehicle j; wherein $x_j$ represents a coordinate of the vehicle j along a driving direction which is a positive direction of x-axis, $y_j$ represents a coordinate of the vehicle j along a direction perpendicular to the driving direction, $R_1$ represents the first lane, and $R_2$ represents the second lane;

2) calculating a distance $D_{ij}$ between the vehicle i and a following vehicle j, wherein the following vehicle j meets $x_j < x_i$, $x_i$ represents a coordinate of the vehicle i along the driving direction;

3) comparing the distance $D_{ij}$ between the vehicle i and the following vehicle j with the communication range R of the vehicle i; determining the vehicle j as a message transmission object of the vehicle i and defining the vehicle j as a vehicle k when $D_{ij} < R$; and establishing a set S containing all of the vehicle k, wherein, a total number of vehicles meeting the condition of $D_{ij} < R$ is $T_{N\_k}$, $k=1, 2, 3 \ldots, T_{N\_k}$;

4) comparing a distance $D_{ik}$ between the vehicle i and the vehicle k defined in the step 3) with the safety distance $D_s$ between vehicles; calculating a priority index $\lambda_{ik}$ when $D_{ik} < D_s$ which represents that the vehicle k is within the safety distance of the vehicle i, wherein the smaller the value of the $D_{ik}$ is, the smaller the priority index $\lambda_{ik}$ becomes; carrying out message transmission in order of the priority index from small to large;

5) deleting vehicles to which the message have been transmitted in the step 4) from the set S established in the step 3) to establish a new set $S_2$, wherein the vehicle k in the set $S_2$ outside the safety distance $D_s$ of the vehicle i, within the communication range R, in a direction following the vehicle i, and meeting a condition of $x_k < x_i$, wherein $x_k$ represents a coordinate of the vehicle k along the driving direction;

6) defining a prediction processing time interval, and predicting a distance $D_{ik}'$ between a vehicle k in the set $S_2$ and the vehicle i according to a vehicle speed; and 7) calculating a priority index $\lambda_{ik}'$ for vehicles in the set $S_2$, and establishing a D2D connection pair between the vehicle i and the vehicle k, in order of the priority index $\lambda_{ik}'$ from small to large to transmit the message.

Optionally, the distance $D_{ij}$ between the vehicle i and the following vehicle j in the step 2) is calculated according to an expression:

$$D_{ij} = \sqrt{(x_i - x_j)^2 + (y_i - y_j)^2},$$

where $(x_i, y_i)$ represents a position of the vehicle i, and $x_j < y_i$) which defines that the vehicle j is a vehicle in a direction following the vehicle i.

Optionally, the distance $D_{ik}$ between the vehicle i and the vehicle k in the step 4) is calculated according to an expression:

$$D_{ik} = \sqrt{(x_i - x_k)^2 + (y_i - y_k)^2},$$

where $(x_i, y_i)$ represents a position of the vehicle i, and $(x_k, y_k)$ represents a position of the vehicle k.

Optionally, the priority index in the step 4) is calculated according to an expression:

$$\lambda_{ik} = \frac{D_{ik}}{R}.$$

Optionally, the step 4) further comprises:

41) selecting a vehicle k corresponding to a minimum priority index, and first establishing a D2D connection pair between the vehicle i and the vehicle k corresponding to the minimum priority index to transmit the message;

42) selecting a vehicle corresponding to a secondary minimum priority index after transmitting the message, and establishing a D2D connection pair between the vehicle i and the vehicle corresponding to the secondary minimum priority index to transmit the message; and 43) repeating the step 42) to execute a step of establishing a D2D connection pair between the vehicle i and each vehicle within the safety distance, in order of the priority index from small to large to transmit the message.

Optionally, the prediction processing time interval T in the step 6) is defined as 100 ms, and the predicted distance $D_{ik}'$ is calculated according to an expression:

$$D_{ik}'=\sqrt{(|x_i-x_k|-|v_i-v_k|T)^2+(y_i-y_k)^2},$$

where $(x_i,y_i)$ represents a position of the vehicle i, $(x_k,y_k)$ represents a position of the vehicle k, $v_i$ represents a speed of the vehicle i, and $v_k$ represents a speed of the vehicle k.

Optionally, the priority index in the step 7) is calculated according to an expression:

$$\lambda_{ik}' = \frac{D_{ik}'}{R}.$$

Optionally, a vehicle in the same lane is preferentially selected to establish a D2D connection pair to transmit the message if same priority indexes appear in the step 4) or the step 7).

The advantageous effect of the disclosure: the present disclosure provides a method for transmitting an emergency message based on D2D communication in Internet of Vehicles, which can realize a timely transmission of safety warning information for safety warning, thereby solving the technical problem that safety information cannot be transmitted in time. The disclosure carries out message transmission based on D2D communication instead of the traditional DSRC short-range communication technology in Internet of Vehicles, such that the data traffic does not pass through the base station and the core network, thereby optimizing network load of the operator and achieving higher reliability in emergency message transmission scenarios. The disclosure divides vehicles into different clusters, so as to transmit emergency messages to vehicles within the safety distance of a certain vehicle first, so that these vehicles can receive safety warning messages in time, to avoid unnecessary accidents due to an untimely message transmission, and improve the safety performance of the Internet of Vehicles. Different priority indexes are provided for different vehicle clusters, and the distance prediction is carried out for the vehicles in the following direction outside the safety distance and within the transmission range, to calculate the corresponding priority index according to the predicted distance, and establish the D2D connection pairs in order of priority index from small to large, wherein the distance prediction between vehicles by using vehicle speed makes the priority index more real-time and effective, thus improving the transmission efficiency of emergency messages.

BRIEF DESCRIPTION OF DRAWING

FIG. 1 is a flowchart of a method for transmitting an emergency message, in accordance with an embodiment of the disclosure.

DETAILED DESCRIPTION OF EMBODIMENTS

The technical solution of the disclosure will be further described hereinafter with reference to the accompanying drawings and in conjunction with the embodiments.

The FIGURE is a flowchart of a method for transmitting an emergency message, in accordance with an embodiment of the disclosure. According to the method for transmitting an emergency message based on D2D communication in Internet of Vehicles, when there is an emergency message from the vehicle i need to be transmitted, a request for orthogonal spectrum resources is made to the base station for D2D connection to transmit the message. The method specifically comprises the following steps of:

1) vehicle i collecting information about an adjacent vehicle j periodically during driving, comprising a position $(x_j,y_j)$ of the vehicle j, a speed $v_j$ of the vehicle j, a lane $R_1$ or $R_2$ of the vehicle j; wherein $x_j$ represents a coordinate of the vehicle j along a driving direction which is the positive direction of x-axis, $y_j$ represents a coordinate of the vehicle j along a direction perpendicular to the driving direction, $R_1$ represents the first lane, and $R_2$ represents the second lane;

2) calculating a distance $D_{ij}$ between the vehicle i and the adjacent vehicle j according to an expression: $D_{ij}=\sqrt{(x_i-x_j)^2+(y_i-y_j)^2}$, wherein $x_j<x_i$, which represents the vehicle j is a vehicle in a direction following the vehicle i;

3) comparing the distance $D_{ij}$ between the vehicle i and the adjacent vehicle j with the communication range R of the vehicle i; determining the vehicle j as a message transmission object of the vehicle i and defining the vehicle j as a vehicle k when $D_{ij}<R$; and establishing a set S containing all of the vehicle k, wherein, a total number of vehicles meeting the condition of $D_{ij}<R$ is $T_{N\_k}$, k=1, 2, 3 . . . , $T_{N\_k}$;

4) transmitting the message in order of the priority index from small to large, wherein, a safety distance between vehicles is defined as $D_s$, a distance $D_{ik}$ between the vehicle i and the vehicle k defined in the step 3) is calculated according to an expression: $D_{ik}=\sqrt{(x_i-x_k)^2+(y_i-y_k)^2}$, to calculate a priority index $\lambda_{ik}$ according to an expression:

$$\lambda_{ik} = \frac{D_{ik}}{R}$$

when $D_{ik}<D_s$ which represents that the vehicle k is within the safety distance of the vehicle i, i.e. the vehicle k with a priority index $\lambda_{ik}$ needs to meet a condition of $D_{ik}<D_s$; wherein, the step of transmitting the message comprises:

41) selecting a vehicle k corresponding to a minimum priority index, and first establishing a D2D connection pair between the vehicle i and the vehicle k corresponding to the minimum priority index to transmit the message;

42) selecting a vehicle corresponding to a secondary minimum priority index after transmitting the message, and establishing a D2D connection pair between the vehicle i and the vehicle corresponding to the secondary minimum priority index to transmit the message;

43) repeating the step 42) to execute a step of establishing a D2D connection pair between the vehicle i and each vehicle within the safety distance in order of the priority index from small to large to transmit the message.

In various embodiments, if vehicles with same priority indexes exist during the selecting process, a vehicle driving in the same lane among them is preferentially selected to transmit the message.

5) deleting vehicles to which the message have been transmitted in the step 4) from the set S established in the step 3) to establish a new set $S_2$, wherein the vehicle k in the set $S_2$ is outside the safety distance $D_s$ of the vehicle i, within the communication range R and in a direction following the vehicle i;

6) defining a prediction processing time interval, such as 100 ms, i.e., T=100 ms, and predicting a distance $D_{ik}'$ between a vehicle k in the set $S_2$ and the vehicle i according to an expression:

$$D_{ik}'=\sqrt{(|x_i-x_k|-|v_i-v_k|T)^2+(y_i-y_k)^2};$$

7) calculating a priority index $\lambda_{ik}'$ according to an expression:

$$\lambda_{ik}' = \frac{D_{ik}'}{R};$$

and establishing a D2D connection pair between the vehicle i and the vehicle k in order of the priority index $\lambda_{ik}'$ from small to large to transmit the message.

In various embodiments, if vehicles with the same priority indexes exist during the selecting process, a vehicle driving in the same lane among them is preferentially selected to transmit the message.

What is claimed is:

1. A method for transmitting an emergency message based on Device-to-Device (D2D) communication in Internet of Vehicles, comprising following steps of:
   1) vehicle i collecting information wirelessly received from an adjacent vehicle about an adjacent vehicle j during driving, comprising a position $(x_j, y_j)$ of the vehicle j, a speed $v_j$ of the vehicle j, and a lane R1 or R2 where the vehicle j is traveling; wherein $x_j$ represents a coordinate of the vehicle j along a driving direction which is a positive direction of x-axis, $y_j$ represents a coordinate of the vehicle j along a direction perpendicular to the driving direction, R1 represents a first lane, and R2 represents a second lane;
   2) calculating a distance $D_{ij}$ between the vehicle i and a following vehicle j, wherein the following vehicle j meets $x_j < x_i$, $x_i$ represents a coordinate of the vehicle i along the driving direction;
   3) comparing the distance $D_{ij}$ between the vehicle i and the following vehicle j with a preconfigured communication range R of the vehicle i; determining the vehicle j as a destination of the emergency message sent by the vehicle i and defining the vehicle j as a vehicle k when $D_{ij} < R$; and establishing a set S containing all of the vehicle k, wherein, a total number of vehicles meeting the condition of $D_{ij} < R$ is $T_{N,k}$, k=1, 2, 3, ..., $T_{N,k}$;
   4) comparing a distance $D_{ik}$ between the vehicle i and the vehicle k defined in the step 3) with a predetermined safety distance $D_s$ between vehicles; calculating a priority index $\lambda_{ik}$ when $D_{ik} < D_s$ which represents that the vehicle k is within the safety distance of the vehicle i, wherein a smaller a value of the $D_{ik}$ is, the smaller the priority index $\lambda_{ik}$ becomes; establishing a D2D connection pair between the vehicle i and the vehicle k in order of the priority index from small to large to transmit the emergency message;
   5) deleting vehicles to which the emergency message have been transmitted in the step 4) from the set S established in the step 3) to establish a new set $S_2$, wherein the vehicle k in the set $S_2$ outside the safety distance $D_s$ of the vehicle i, within the preconfigured communication range R, in a direction following the vehicle i, and meeting a condition of $x_k < x_i$, wherein $x_k$ represents a coordinate of the vehicle k along the driving direction;
   6) defining a prediction processing time interval, and predicting a distance $D_{ik}'$ between a vehicle k in the set $S_2$ and the vehicle i according to the vehicle speed; and
   7) calculating a priority index $\lambda_{ik}'$ for vehicles in the set $S_2$, and establishing a D2D connection pair between the vehicle i and the vehicle k in order of the priority index $\lambda_{ik}'$ from small to large to transmit the emergency message.

2. The method for transmitting the emergency message based on D2D communication in Internet of Vehicles of claim 1, wherein the distance $D_{ij}$ between the vehicle i and the following vehicle j in the step 2) is calculated according to an expression:

$$D_{ij} = \sqrt{(x_i - x_j)^2 + (y_i - y_j)^2},$$

where $(x_i, y_i)$ represents a position of the vehicle i, and $x_j < x_i$, which defines that the vehicle j is a vehicle in a direction following the vehicle i.

3. The method for transmitting the emergency message based on D2D communication in Internet of Vehicles claim 1, wherein the distance $D_{ik}$ between the vehicle i and the vehicle k in the step 4) is calculated according to an expression:

$$D_{ik} = \sqrt{(x_i - x_k)^2 + (y_i - y_k)^2}$$

where $(x_i, y_i)$ represents a position of the vehicle i, and $(x_k, y_k)$ represents a position of the vehicle k.

4. The method for transmitting the emergency message based on D2D communication in Internet of Vehicles of claim 1, wherein the priority index $\lambda_{ik}$ in the step 4) is calculated according to an expression:

$$\lambda_{ik} = \frac{D_{ik}}{R}.$$

5. The method for transmitting the emergency message based on D2D communication in Internet of Vehicles of claim 1, wherein the step 4) further comprises:
   41) selecting a vehicle k corresponding to a minimum priority index, and first establishing a D2D connection pair between the vehicle i and the vehicle k corresponding to the minimum priority index to transmit the emergency message;
   42) selecting a vehicle corresponding to a secondary minimum priority index after transmitting the emergency message, and establishing a D2D connection pair between the vehicle i and the vehicle corresponding to the secondary minimum priority index to transmit the emergency message; and
   43) repeating the step 42) to execute a step of establishing a D2D connection pair between the vehicle i and each vehicle within the safety distance in order of the priority index from small to large to transmit the emergency message.

6. The method for transmitting the emergency message based on D2D communication in Internet of Vehicles of claim 1, wherein the prediction processing time interval T in the step 6) is defined as 100 ms, and the predicted distance $D_{ik}'$ is calculated according to an expression:

$$D_{ik}' = \sqrt{(|x_i - x_k| - |v_i - v_k|T)^2 + (y_i - y_k)^2};$$

where $(x_i, y_i)$ represents a position of the vehicle i, $(x_k, y_k)$ represents a position of the vehicle k, $v_i$ represents a speed of the vehicle i, and $v_k$ represents a speed of the vehicle k.

7. The method for transmitting the emergency message based on D2D communication in Internet of Vehicles of claim 1, wherein the priority index $\lambda_{ik}'$ in the step 7) is calculated according to an expression:

$$\lambda'_{ik} = \frac{D'_{ik}}{R}.$$

8. The method for transmitting the emergency message based on D2D communication in Internet of Vehicles of claim 1, wherein a vehicle in a same lane is preferentially selected to establish a D2D connection pair to transmit the emergency message if same priority indexes appear in the step 4) or the step 7).

\* \* \* \* \*